June 5, 1951

F. N. DICKERMAN 2,555,635

CABLE TENSIONING AND RETRACTING
DEVICE FOR BOMB SUPPORTS

Filed May 1, 1945

Inventor
Fred N. Dickerman,

By Ralph L. Chappell
Attorney

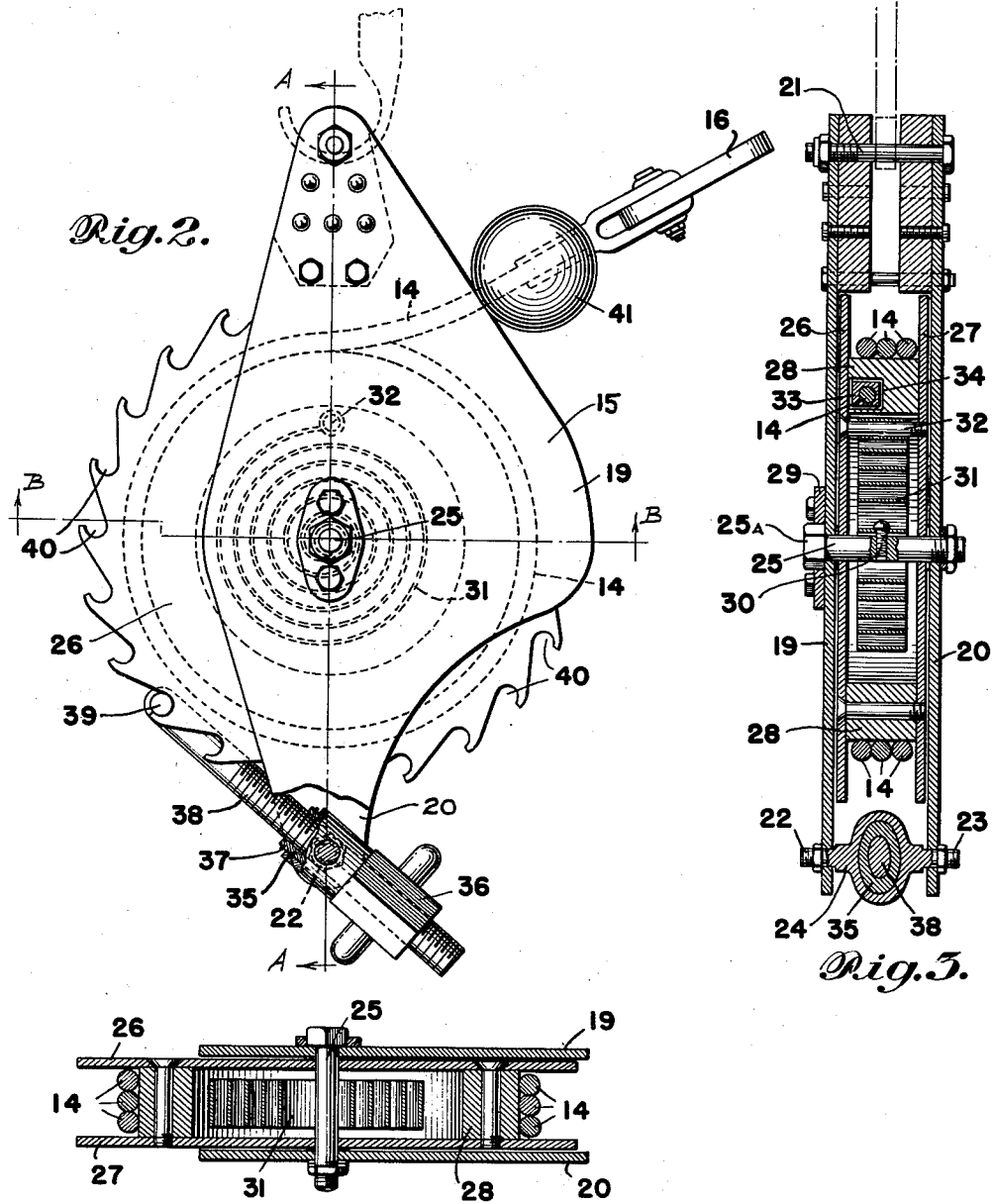

June 5, 1951

F. N. DICKERMAN 2,555,635

CABLE TENSIONING AND RETRACTING
DEVICE FOR BOMB SUPPORTS

Filed May 1, 1945

Inventor
Fred N. Dickerman,
By Ralph L. Chappell
Attorney

Patented June 5, 1951

2,555,635

UNITED STATES PATENT OFFICE 2,555,635

CABLE TENSIONING AND RETRACTING DEVICE FOR BOMB SUPPORTS

Fred N. Dickerman, Bridgeport, Conn., assignor to United Aircraft Corporation, East Hartford, Conn., a corporation of Delaware Application May 1, 1945, Serial No. 591,243

3 Claims. (Cl. 89—1.5)

This invention relates to tensioning devices and more particularly to a new and improved cable tensioning and retracting device for use in connection with bomb slings on aircraft.

In supporting and releasing bombs, torpedoes, auxiliary tanks and the like on aircraft, it has been customary to retain the object to be secured by means of one or more supporting cables in the form of slings, one end being fixed to the aircraft and the other end being secured by a releasable catch so that at the desired instant the aircraft operator may release the catch, and the cable end is free to fall or sling out of the way as the article drops.

This prior construction is subject to several objections inasmuch as a number of cables of the required length must be employed with each size of object to be retained in place. In addition, as the bomb drops, the free end of the cable violently swings in an arc and, with the heavy release fitting on its end, may cause damage to the adjacent aircraft structure. It is therefore an object of the present invention to provide a means for automatically varying cable lengths as desired when the cable is used to hold objects of varying sizes and to provide means for retracting the cable as the object drops so that its free end will be restrained from striking and damaging the adjacent aircraft structure.

An additional difficulty presented by the constructions heretofore employed is that the long cables used as bomb slings would hang below the plane's fuselage and would prevent proper closing of the bomb bay doors. It is an object of the present invention to provide a cable retracting device which will immediately withdraw the cables as they are released so that they will be safely inside of the bomb bay and will be out of the way of the falling bombs and the closing bomb bay doors.

In addition, it is important that the bomb or other object be securely retained in place and restrained against movement during flight, therefore, it is an object of the present invention to provide new and improved means for engaging and retaining immobile an object so supported, which means is adaptable to objects of varying diameters.

A further object of the present invention is to provide means for drawing cables snugly about the object to be supported and to provide, in combination, a compact cable retracting structure which will quickly and positively withdraw the bomb retaining cable.

Further objects and advantages of the present invention will be apparent from the specification and claims when considered in conjunction with the accompanying drawings in which:

Fig. 2 is an enlarged detailed view of a cable retracting reel constructed in accordance with the present invention;

Fig. 3 is a vertical cross-section through the reel of Fig. 2 taken along a line substantially corresponding to line A—A of Fig. 2;

Fig. 4 is a horizontal sectional view through the reel of Fig. 2 looking upwardly taken along a line substantially corresponding to line B—B of Fig. 2;

Figure 1:
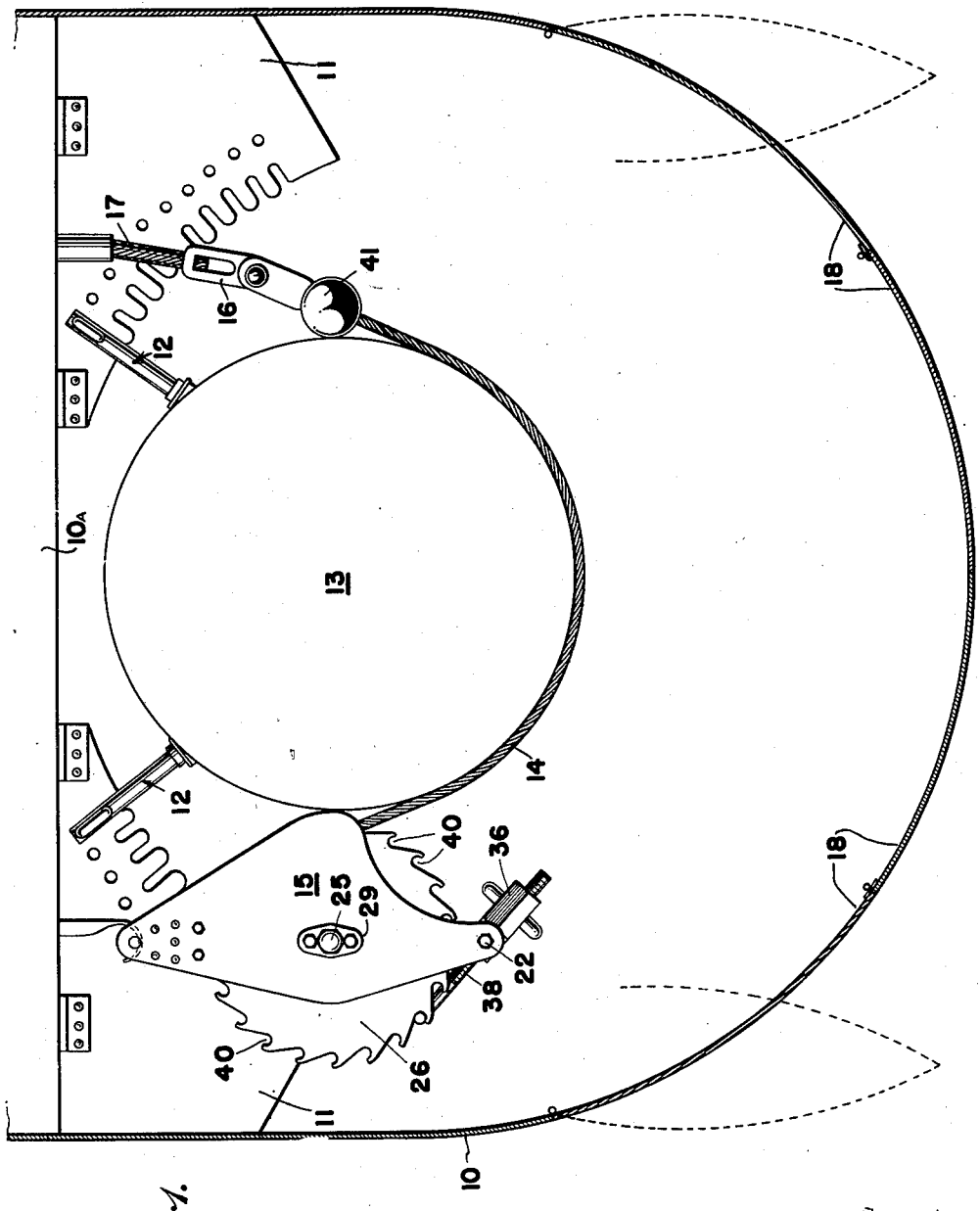
Fig. 1 is a transverse sectional view through the lower portion of an aircraft fuselage showing bombs supported in accordance with the present invention.

Referring to Fig. 1, the embodiment there shown includes an aircraft fuselage 10 having a suitable cross member 10a from which may depend hinged plates 11 upon which missile-engaging chocks 12 may be mounted. These chocks may be adjustable along a series of notches in the plate in a manner hereinafter set forth so as to accommodate missiles of various diameters. A cylindrical missile, such as a bomb 13, is shown retained in place against the chocks within a cradle formed by means of a plurality of transversely extending cables 14, one end of each of which may be fixedly secured to the aircraft structure through the medium of a cable retracting reel comprising a portion of the present invention. The opposite end of each of the cables 14 may be provided with a release engaging link 16 which may be engaged and normally held by means of a bomb release catch 17 of conventional design and not forming any part of the present invention.

The aircraft fuselage 10 may be provided in its lower part with folding bomb bay doors 18 which can be retracted by suitable means (not shown) to the dotted line position indicated in Fig. 1 so that the bomb 13 may pass freely through the bottom of the fuselage at the desired time upon its release.

The cable retracting reel 15 is illustrated in detail in Figs. 2, 3 and 4 and as there shown comprises a pair of spaced cheek plates 19 and 20 secured together at the top by suitable means including a through bolt 21 and at the bottom by means of the oppositely extending trunnion portions 22 and 23 of a swively pivoted fitting nut 24.

A central axle 25 passes through these cheek plates and mounts a cable accommodating drum having side plates 26 and 27 which are spaced apart by a central portion 28 in the manner shown.

The axle 25 is retained immobile by any suitable means, as for example, a lock plate 29 which has a central hexagonal opening which is adapted to surround a hexagonal head 25a on the axle bolt 25. To the center portion of the axle may be secured by any suitable means, as for example, the screw 30, a coiled spring 31, the outer end of which is secured to an anchor screw 32 forming a part of the rotatable drum. Obviously, with this arrangement rotation of the drum in a clockwise manner in Fig. 1 is resisted by the resilient spring 31 which tends to return the drum to its original position at all times.

A number of cable retracting reels 15 may be employed, one for each transverse cable or sling used to retain a missile in place and these cables may be secured at one end to the drum as in the manner shown in Fig. 3 wherein an enlarged anchor block 33 is positioned in a slot 34 in the portion 28 of the drum.

In order to apply sufficient torque to the cable supporting reel so as to urge the missile snugly into place and draw the cables 14 taut, the marginal edges of the side plates 26 and 27 may be scalloped as indicated to provide a plurality of adjacent serrations or ratchet teeth with which a tension applying member may be associated. This tension applying member in the present invention comprises the swively mounted fitting 24 having oppositely extending trunnions 22 and 23 which fitting has an internally threaded sleeve portion 35 of a nut 36 extending therethrough. This device is retained in place by means of a split ring washer 37.

Into the nut 36 may be threaded a tension applying post 38 having oppositely extending ratchet engaging lugs 39 which may selectively engage various of the ratchet teeth 40 spaced about the periphery of the side plates 26 and 27.

If desired, a suitable bumper may be provided in the form of a ball on the end of cable 14 and may be of rubber or suitable resilient material whereby upon rapid retraction of the cable it will strike the edges of the cheek plates 19 and 20 thereby snubbing the cable end to stop rotation of the device and prevent possible injury to the free end of the cable and adjacent parts of the plane.

Figure 5:
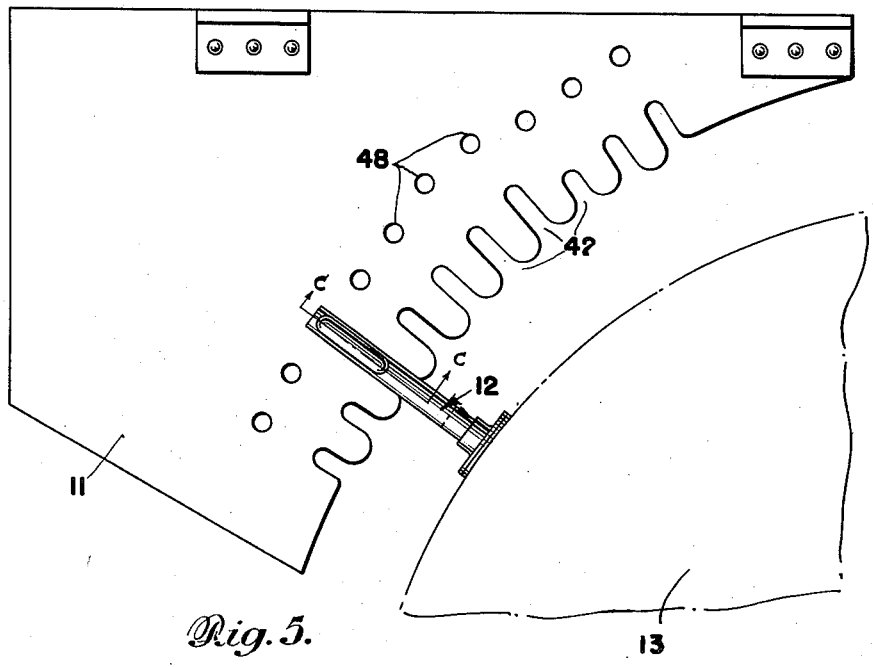
Fig. 5 is an enlarged detailed side elevation of an adjustable load bracing chock constructed in accordance with the present invention.
Figure 6:
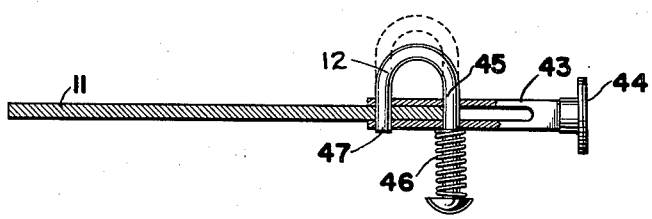
Fig. 6 is a sectional view of the chock shown in Fig. 5 taken along a line substantially corresponding to line C—C of Fig. 5.

As shown in Figs. 5 and 6, the depending plates 11 may be provided with a plurality of marginal notches 42 into which an adjustable chock 12 may be inserted as required by the size of the missile to be retained in place.

Fig. 6 shows in detail the construction of the chock in accordance with the present invention wherein it includes a stem portion 43 having an enlarged missile engaging pad 44 at one end and an attached clip including a reversely formed detent 45 which is normally retained by means of a spring 46 so that its outer end 47 enters into and locks with one of the spaced openings 48 in opposition to the selected notch 42 by means of which the chock is to be supported.

The above described chock is here illustrated as employed in an arrangement for supporting aircraft bombs in place. However, it will be apparent that it is capable of further and additional uses within the scope and spirit of the present invention.

In operation the hinged cross plates 11 are moved into position and chocks 12 adjusted therealong to the size of the bomb or other object to be supported in place. The bomb may then be hoisted in the usual manner as by means of hoist bands and when so supported in place, the free end of the cable 14 may be reeled out and the link 16 engaged with the customary release device 17 of the plane. Because of the spring tension provided by the coiled spring 31, the cable 14 is drawn snugly about the bomb which is already in place against the chocks 12.

Thereafter, it is desired to apply a positive tension to the cables 14 so that the bomb may be held securely in place and this enclosed tension is provided by means of the tensioning device including a screw post 38 having oppositely extending ratchet engaging lugs 39 which may engage in suitable serrations 40 in the manner shown in Figs. 1 and 2. Tension may thereafter be applied through rotation of nut 36 by means of the wing portions shown or by a wrench applied to engage this nut. Obviously, rotation of the nut draws the screw threaded screw post 38 through the nut and rotates the cable supporting drum to the left to apply the desired tension upon cable 14.

Thereafter, the hoist bands used to install the missile may be removed, and the cable is ready for release at the desired time at the will of the operator after the objective has been reached. It will be noted that by the above arrangement, the effective length of the cable has been adjusted automatically for the particular bomb installation.

Upon release of the bomb, the spring 31 rotates the drum counterclockwise, retracting the bomb supporting cables 14 inside of the bomb bay and out of the way of the falling bomb and the closing bomb bay doors.

Of course, suitable guards or shields may be added to the device to enclose the ratchet teeth and prevent damage to the teeth or servicing personnel.

It will be apparent that with the structure above disclosed, a simple compact and efficient cable retracting device for aircraft supported bombs is provided. However, it will be obvious that this device is adapted with equal facility to the retaining of any movable objects in place and may be employed as a cargo sling or other support and has many other uses as will readily become apparent to those skilled in the art.

What is claimed is:

1. A device for supporting articles in a vehicle including a cable, adjustable chocks, plate supports for said chocks attached thereto, hinge means pivoted horizontally to connect the upper edges of said supports to the vehicle to permit swinging said supports upwardly into horizontal position against the vehicle structure, and adjustable means securing one end of said cable to said vehicle.

2. A retractable device for supporting bombs within the bomb bay of an aircraft including a cable, means attached to one end of the cable for winding in the cable, a support for the cable winding means attached thereto, and horizontally pivoted hinge elements securing the support to aircraft structure defining the top of the bomb bay whereby the cable and winding means may be swung upwardly from the space constituting the bomb bay.

3. Mechanism for suspending articles from the framework of a carriage, comprising a cable designed for connection at one end to the framework and connected at its other end to a tensioning drum, means supporting said drum on said framework at such a point that the cable forms a tensioned sling for the article to be supported; and adjustable chock means secured to said framework adjacent the cable ends, comprising a downwardly extending plate-like arrangement having a series of slots extending inwardly from its lower edge in a direction away from the article to be suspended and also having a corresponding series of holes disposed inwardly from said slots, and means selectively cooperable with each slot and its associated hole and extending outwardly from the stop to provide a chock element.

FRED N. DICKERMAN.

REFERENCES CITED

The following references are of record in the file of this patent:

UNITED STATES PATENTS

| Number | Name | Date |
| --- | --- | --- |
| 1,528,942 | Moser | Mar. 10, 1925 |
| 1,941,880 | Earl | Jan. 2, 1934 |
| 2,010,511 | Crawford | Aug. 6, 1935 |
| 2,342,271 | Hatcher | Feb. 22, 1944 |
| 2,342,514 | Hojnowski | Feb. 22, 1944 |
| 2,362,361 | Davis | Nov. 7, 1944 |
| 2,392,400 | Neff | Jan. 8, 1946 |

FOREIGN PATENTS

| Number | Country | Date |
| --- | --- | --- |
| 495,329 | Great Britain | Nov. 10, 1938 |